United States Patent [19]
Meszaros

[11] Patent Number: 5,935,388
[45] Date of Patent: Aug. 10, 1999

[54] DISTILLATION PLANT WITH A HEAT PUMP

[75] Inventor: Istvan Meszaros, Winterthur, Switzerland

[73] Assignee: Sulzer Chemtech AG, Winterthur, Switzerland

[21] Appl. No.: 08/954,249

[22] Filed: Oct. 20, 1997

[30] Foreign Application Priority Data

Nov. 19, 1996 [EP] European Pat. Off. ............. 96810809

[51] Int. Cl.⁶ ............................... B01D 1/28; B01D 3/00
[52] U.S. Cl. ......................... 202/155; 62/238.6; 62/500;
159/24.3; 159/DIG. 40; 202/172; 202/182;
203/26; 203/27; 203/DIG. 4; 203/DIG. 8;
203/DIG. 14; 203/73; 203/77; 203/79
[58] Field of Search ................................ 203/26, 96, 97,
203/98, 79, DIG. 4, 73, 77, DIG. 14, 24,
27, DIG. 8; 62/238.6, 501, 500; 159/24.3;
202/172, 182, 155

[56] References Cited

U.S. PATENT DOCUMENTS

| | | | |
|---|---|---|---|
| 2,615,833 | 10/1952 | Dean et al. | 203/93 |
| 2,619,814 | 12/1952 | Kniel | 62/628 |
| 3,766,020 | 10/1973 | Sieder | 202/26 |
| 3,796,640 | 3/1974 | Boomer | 203/11 |
| 3,875,019 | 4/1975 | Cocuzza et al. | 203/26 |
| 4,023,946 | 5/1977 | Schwartzman | 203/26 |
| 4,177,137 | 12/1979 | Kruse | 203/26 |
| 4,277,268 | 7/1981 | Spangler, Jr. | 203/24 |
| 4,309,254 | 1/1982 | Dahlstrom et al. | 203/100 |
| 4,379,734 | 4/1983 | Franzen | 203/25 |
| 4,626,321 | 12/1986 | Grethlein | 203/26 |
| 4,695,349 | 9/1987 | Becker et al. | 203/26 |

FOREIGN PATENT DOCUMENTS

| | | |
|---|---|---|
| 0 155 578 | 9/1985 | European Pat. Off. . |
| 0 210 888 | 2/1987 | European Pat. Off. . |
| 1114168 | 9/1961 | Germany . |

OTHER PUBLICATIONS

Meili, Albert, et al. "Heat Pumps for Distillation Columns", *Chemical Engineering Progress* 86(1990) Jun., No. 6, 60–64.

*Primary Examiner*—Virginia Manoharan
*Attorney, Agent, or Firm*—Townsend and Townsend and Crew LLP

[57] ABSTRACT

A distillation plant includes a heat pump whose working fluid is compressed by a vapor jet compressor. A collection location for a liquid is arranged in the stripper part of a distillation column of the plant. At least a portion of the collected liquid is provided in the vaporized form as strip vapor. Connections lead from the collection location to a first vaporizer and to a second vaporizer. The liquid can be vaporized in these vaporizers at an elevated and at a reduced pressure respectively. The vapor jet compressor is connected to the two vaporizers and to the column in such a manner that the vapor from the second vaporizer can be compressed under a driving jet action of the vapor from the first vaporizer and used in the column as strip vapor. A pump is arranged in the connection to the first vaporizer and at least one restrictor member is contained in the connection to the second vaporizer.

9 Claims, 1 Drawing Sheet

DISTILLATION PLANT WITH A HEAT PUMP

BACKGROUND OF THE INVENTION

The invention relates to a distillation plant with a heat pump and to a distillation method with a plant of this kind.

It is known that when carrying out distillation using a column the exhaust vapors can be utilized by means of a heat pump for the purpose of saving energy. A portion of the thermal energy arriving at the head of the column is brought to a higher temperature level by the heat pump and the so-transformed thermal energy is used for the heating of a sump vaporizer. In this arrangement a direct condensation of the exhaust vapors can, for example, be performed with radial compressors.

It is known that a vapor jet compressor operated with water vapor can be used economically for condensing the exhaust vapors if the head product is water. The object of the invention is to provide an economical distillation plant with a vapor jet heat pump, in which the head product does not however consist of water.

SUMMARY OF THE INVENTION

The distillation plant comprises a heat pump whose working fluid is compressed by means of vapor jet compressor. A collection location for a liquid is arranged in the stripper part of the distillation column of the plant. At least a portion of the collected liquid is provided in vaporized form as strip vapor. Connections lead from the collection location to a first vaporizer and to a second vaporizer. In these vaporizers the liquid can be vaporized at an elevated pressure and at a reduced pressure respectively. The vapor jet compressor is connected to the two vaporizers and to the column in such a manner that the vapor from the second vaporizer can be compressed under the driving jet action of the vapor from the first vaporizer and used in the column as strip vapor. A pump is arranged in the connection to the first vaporizer and at least one restrictor member is contained in the connection to the second vaporizer.

In a preferred special case the vapor jet compressor operates with a vaporized sump product as the propulsion jet and also as the working fluid (where working fluid is understood to mean the substance by means of which the heat pump performs the thermal transformation: taking up heat at a lower temperature/giving off heat at a higher temperature). The resultant vapor mixture is fed into the column and acts there as a stripping means. Instead of the sump product, liquid can be provided from a collection location which is arranged between two installation sections of the driving part. The low temperature heat is won through condensation of a portion of the vaporous head product or through condensation of vapor which is branched off between the installation sections of the upper part of the column.

Instead of a single heat pump, a plurality of heat pumps with vapor jet compressors can also be provided, with, for example, the sump product being used as the working fluid of a first heat pump and with an intermediate product being used as the working fluid of a second heat pump. The temperatures of the low temperature heat sources can be the same or different. The driving jets of two or more heat pumps can be fed by a common vaporizer. A common low temperature source can also be associated with two or more heat pumps.

DESCRIPTION OF THE PREFERRED EMBODIMENTS

Figure 1:
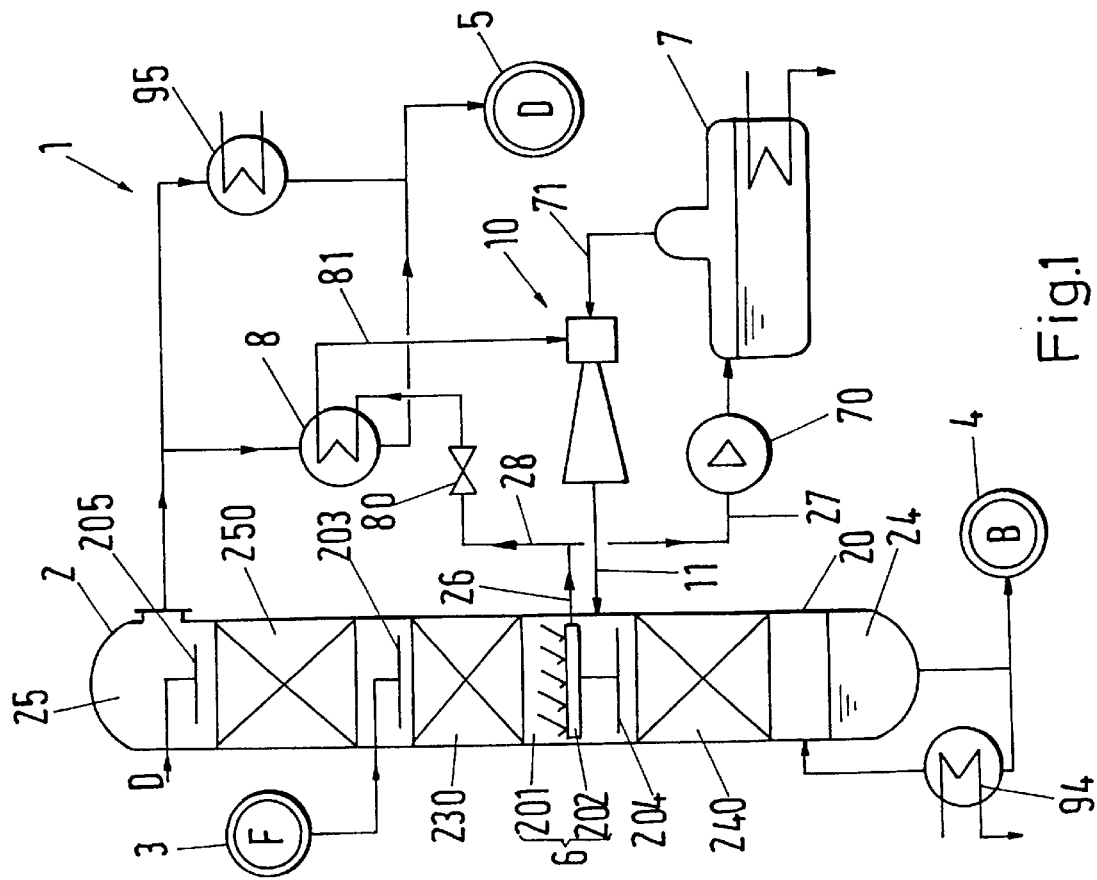
FIG. 1 shows a first exemplary embodiment of the distillation plant in accordance with the invention.

The distillation plant a with a heat pump shown in FIG. 1 comprises the following parts: a column 2 with a stripper part 20, a sump 24, a sump vaporizer 94, a head 25 and a condenser 95 for exhaust vapors from the column; a vapor jet compressor 10, a first vaporizer 7, a pump 70, a second vaporizer 8, a restrictor member 80; and furthermore, various connection lines.

A raw solution F from a reservoir 3 is separated into fractions by the distillation, namely into a sump product B (reservoir 4) and a distillate D (reservoir 5). The raw solution F is for example a mixture of iso-propanol, water and acetone with the following composition in percentage by weight: 82.5, 16.5 and 1.0 respectively. The sump product which is produced is water which still contains acetone; the distillate consists of 85.6% iso-propanol, 13.4% water and 1.0% acetone. The following figures relate to this special example of the method.

The column 2 contains sections 230, 240 and 250 with installed inserts, which are, for example, ordered packings. The installed inserts can also be bulk collections of filling bodies or bases. The raw solution F arrives via a distributor 203 at the installation section 230 with an installed insert. A liquid collector 6 (lamella 201, trough 202) is arranged under this section 230 and is constructed in such a manner that the flow of vapor streaming upwards is largely unrestricted. The liquid of the collection location 6 passes partly into a distributor 204 of the lower installation section 240 and is partly transported into the vaporizers 7 and 8 via a line 26 and connections 27 and 28 respectively. The distillate D is conducted back into the head 25 of the column and is distributed there over the upper installation section 230 by means of the distributor 205.

The vapor jet compressor 10 is fed via the line 71 with driving vapor from the first vaporizer 7 (absolute pressure for the particular example of the method: 19 bar; temperature: 182° C.). Vapor (1 bar; 83° C.) is sucked in via the line 81 from the second vaporizer 8, whose heat source is formed by condensing exhaust vapors. The condensed exhaust vapors pass into the reservoir 5. A strip vapor (2.3 bar, 148° C.) is produced by the vapor jet compressor and is fed into the column 2 via the line 11 at the collection location 6. Liquid from this collection location 6 is partly (67%) forwarded by the pump 70 into the first vaporizer 7 (pressure increase: 16.7 bar) and partly (33%) conducted via the restrictor member 80 into the second vaporizer 8 (pressure reduction: 1.3 bar). In an embodiment, the vapor from the second vaporizer 8 is compressed by the vapor jet compressor 10 to a pressure which has about twice the value of the vaporizer pressure of the second vaporizer.

Figure 2:
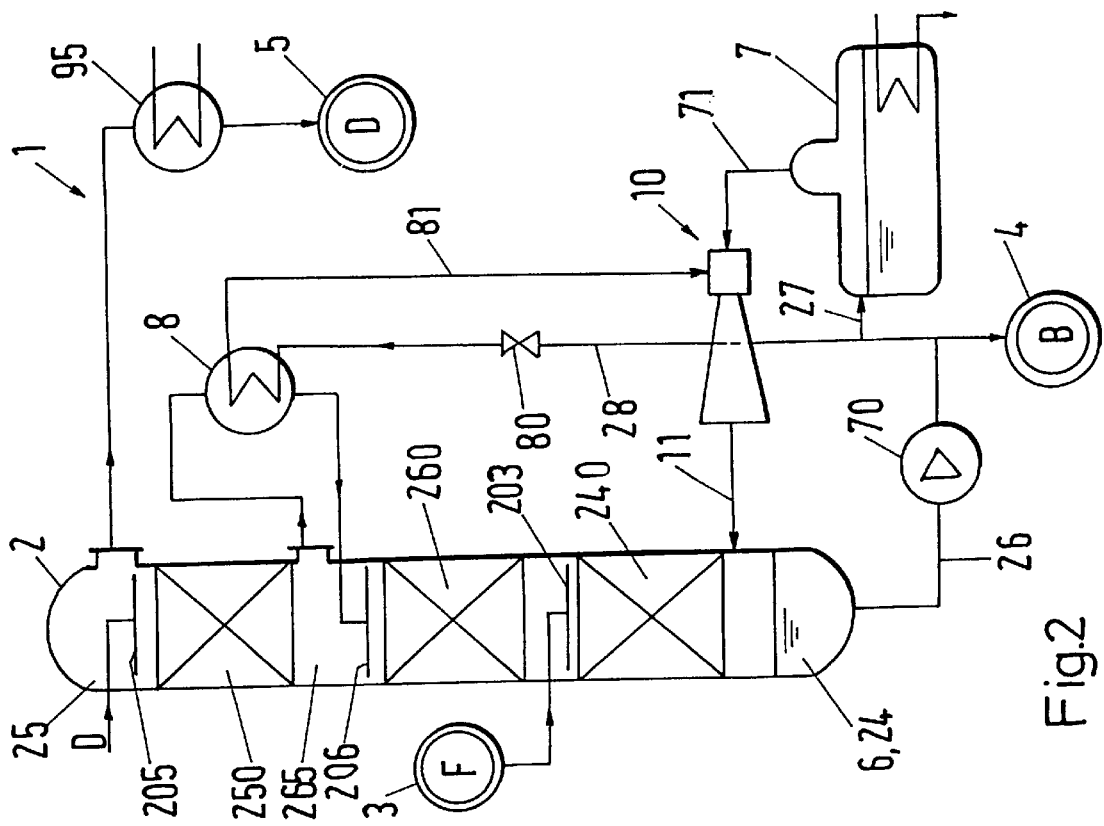
FIG. 2 shows a second exemplary embodiment.

The second exemplary embodiment, illustrated in FIG. 2, is distinguished from the first in two respects:

a) The sump 24 of the column 2 is the collection location 6 for the liquid which is used for the production, in accordance with the invention, of strip vapor by the vapor jet compressor 10.

b) Vapor, which is branched off in a space 265 between two installation sections 250 and 260 of the upper part of the column 2, forms the heat source for the second vaporizer 8.

In the present example the vapor condensed out in the second vaporizer 8 is fed onto the middle installation section 260 by a distributor 206. Since the strip vapor is produced from the sump product B, a sump vaporizer 94 is superfluous. The pump 70 is arranged in the line 26 upstream of the branch position where the two lines 27 and 28 branch off. This special arrangement is not necessary. The branch position could also lie upstream of the pump 70 so that the pump 70 would be located only in the connection 27; and—if necessary at all—a second pump could be provided in the connection 28 if required to overcome a difference in the static liquid pressure between the sump 24 and the second vaporizer 8.

Naturally other combinations of the two exemplary embodiments described are also possible:

a) Arrangement of the vapor jet compressor 10 and of the first vaporizer 7 as in the example of FIG. 2, arrangement of the second vaporizer 8 in accordance with FIG. 1;

b) Arrangement of the vapor jet compressor of the first vaporizer 7 in accordance with FIG. 1, arrangement of the second vaporizer 8 in accordance with FIG. 2.

An example of a method for the first combination in accordance with item a follows.

Raw solution F, formed by a mixture of 1-butene, n-butane, c/t-2-butene, with a composition (% by weight): 99.0%, 0.2% and 0.8% respectively.—Resultant fractions with a corresponding composition in each case: distillate D with 99.8%, 0.0% and 0.2% respectively and sump product B with 55.6%, 7.8% and 36.6% respectively.—Vapor of the first vaporizer 7: 24.4 bar, 120° C.—Vapor of the second vaporizer 8: 2.8 bar, 27° C.—Strip vapor produced by the vapor jet compressor 10: 5.6 bar, 69° C.

In practice the methods described have to compete with distillation methods without heat pumps in which the strip vapor is produced by means of a sump vaporizer 94 and the exhaust vapors are liquefied without heat retrieval in a condenser 95. Substantial savings in costs in the expenditure for energy can be achieved with the plant in accordance with the invention, with the additional costs for the vapor jet compressor (including the equipment for the production of the drive jet) turning out to be relatively low. The savings in costs for the energy are 34% in the first example of the method (FIG. 1) and 36% in the second example of the method (combination in accordance with item a).

As already mentioned, the invention also relates to plants in which a plurality of vapor jet heat pumps are in use simultaneously.

What is claimed is:

1. A distillation plant employing a heat pump, comprising:
   a column including a stripper part and a liquid collection location for a liquid in the stripper part, at least a portion of the liquid collected at the liquid collection location being provided in a vaporized form as a strip vapor;
   a first vaporizer which is disposed downstream of and coupled with the liquid collection location of the column for receiving liquid from the liquid collection location and vaporizing the liquid at an elevated pressure;
   a pump which is disposed between and coupled with the liquid collection location of the column and the first vaporizer;
   a second vaporizer which is disposed downstream of and coupled with the liquid collection location of the column for receiving liquid from the liquid collection location and vaporizing the liquid at a reduced pressure, wherein an upper part of the column includes two installation sections, and a region between the two installation sections is coupled to the second vaporizer to provide a vapor branched off from the column between the two installation sections as a heat source for the second vaporizer;
   at least one restrictor member which is disposed between and coupled with the liquid collection location of the column and the second vaporizer; and
   a vapor jet compressor which is disposed downstream of and coupled with the first vaporizer and the second vaporizer for receiving vapors from the first and second vaporizers, the vapor jet compressor being disposed upstream of and coupled with the column in such a manner that the vapor from the second vaporizer is compressed in the vapor jet compressor under a driving jet action of the vapor from the first vaporizer and is fed into the column and used in the column as a strip vapor.

2. A distillation plant in accordance with claim 1 wherein the liquid collection location comprises a sump of the column.

3. A distillation plant in accordance with claim 1 wherein the stripper part of the column includes two installation sections and the liquid collection location of the column comprises a lamella and a trough arranged between the two installation sections of the stripper part.

4. A distillation plant in accordance with claim 1 wherein the column is coupled with the second vaporizer to provide a vaporous head product of the column as a heat source for the second vaporizer.

5. A distillation plant employing a heat pump, comprising:
   a column including a stripper part and a liquid collection location for a liquid in the stripper part, at least a portion of the liquid collected at the liquid collection location being provided in a vaporized form as a strip vapor;
   a first vaporizer which is disposed downstream of and coupled with the liquid collection location of the column for receiving liquid from the liquid collection location and vaporizing the liquid at an elevated pressure;
   a pump which is disposed between and coupled with the liquid collection location of the column and the first vaporizer;
   a second vaporizer which is disposed downstream of and coupled with the liquid collection location of the column for receiving liquid from the liquid collection location and vaporizing the liquid at a reduced pressure;
   at least one restrictor member which is disposed between and coupled with the liquid collection location of the column and the second vaporizer; and
   means disposed downstream of and coupled with the first vaporizer and the second vaporizer for receiving vapors from the first and second vaporizers and being disposed upstream of and coupled with the column for compressing the vapor from the second vaporizer under a driving jet action of the vapor from the first vaporizer to a pressure which is about twice the vaporizer pressure of the second vaporizer and feeding the vapor from the second vaporizer into the column as a strip vapor.

6. A distillation plant in accordance with claim 5 wherein the liquid collection location comprises a sump of the column.

7. A distillation plant in accordance with claim 5 wherein the stripper part of the column includes two installation sections and the liquid collection location of the column comprises a lamella and a trough arranged between the two installation sections of the stripper part.

8. A distillation plant in accordance with claim 5 wherein the column is coupled with the second vaporizer to provide a vaporous head product of the column as a heat source for the second vaporizer.

9. A distillation plant in accordance with claim 5 wherein an upper part of the column includes two installation sections, and a region between the two installation sections is coupled to the second vaporizer to provide a vapor branched off from the column between the two installation sections as a heat source for the second vaporizer.

* * * * *